US012746931B2

(12) United States Patent
Takahashi

(10) Patent No.: US 12,746,931 B2

(45) Date of Patent: Sep. 29, 2026

(54) ABNORMALITY DETECTION DEVICE

(71) Applicant: YAZAKI CORPORATION, Tokyo (JP)

(72) Inventor: Yuki Takahashi, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 94 days.

(21) Appl. No.: 18/908,756

(22) Filed: Oct. 7, 2024

(65) Prior Publication Data

US 2025/0128717 A1 Apr. 24, 2025

(30) Foreign Application Priority Data

Oct. 19, 2023 (JP) ................................. 2023-180023

(51) Int. Cl.

*B60W 40/08* (2012.01)
*B60W 30/09* (2012.01)
*B60W 50/14* (2020.01)
*G06V 20/59* (2022.01)

(52) U.S. Cl.

CPC ............ *B60W 40/08* (2013.01); *B60W 30/09* (2013.01); *B60W 50/14* (2013.01); *G06V 20/597* (2022.01); *B60W 2040/0818* (2013.01)

(58) Field of Classification Search

CPC ...... B60W 40/08; B60W 30/09; B60W 50/14; B60W 2040/0818; G06V 20/597

See application file for complete search history.

(56) References Cited

U.S. PATENT DOCUMENTS

| | | | | |
|---|---|---|---|---|
| 9,189,897 | B1 * | 11/2015 | Stenneth | B60W 50/14 |
| 11,232,313 | B2 * | 1/2022 | Kanda | G06V 40/174 |
| 2015/0294547 | A1 * | 10/2015 | Ito | G08B 21/06 340/576 |
| 2017/0158054 | A1 | 6/2017 | Munaoka et al. | |
| 2017/0161575 | A1 * | 6/2017 | Banno | G06V 20/597 |
| 2019/0061772 | A1 * | 2/2019 | Prinz | B60W 50/0098 |
| 2019/0213429 | A1 * | 7/2019 | Sicconi | G06V 40/18 |
| 2019/0283579 | A1 | 9/2019 | Munaoka et al. | |
| 2020/0082190 | A1 | 3/2020 | Banno et al. | |
| 2021/0039654 | A1 * | 2/2021 | Morimoto | B60W 50/14 |
| 2021/0107493 | A1 | 4/2021 | Iwashita | |
| 2023/0219600 | A1 | 7/2023 | Xiao | |
| 2023/0227044 | A1 * | 7/2023 | Hara | B60W 50/16 340/576 |

FOREIGN PATENT DOCUMENTS

| | | | |
|---|---|---|---|
| JP | 2010-8268 | A | 1/2010 |
| JP | 6341055 | B2 | 6/2018 |
| JP | 2019-74964 | A | 5/2019 |
| JP | 2021-61903 | A | 4/2021 |
| JP | 2022-128656 | A | 9/2022 |

* cited by examiner

*Primary Examiner* — Mohamed Barakat

(74) *Attorney, Agent, or Firm* — KENEALY VAIDYA LLP

(57) ABSTRACT

An abnormality detection device includes a control unit configured to detect, based on information regarding a driver of a vehicle that has been acquired by an input unit, a warning state indicating a warning that the driver is to become undrivable, and an abnormal state indicating that the driver is undrivable. The input unit includes a camera configured to generate image data, and the information is the image data obtained by capturing an image of the driver by the camera.

10 Claims, 2 Drawing Sheets

ABNORMALITY DETECTION DEVICE

CROSS-REFERENCE TO RELATED APPLICATION(S)

The present application claims priority to and incorporates by reference the entire contents of Japanese Patent Application No. 2023-180023 filed in Japan on Oct. 19, 2023.

BACKGROUND OF THE INVENTION

1. Field of the Invention

The present invention relates to an abnormality detection device.

2. Description of the Related Art

Various abnormality detection devices that detect an abnormal state of a driver who drives a vehicle have been developed. For example, Japanese Patent Application Laid-open No. 2019-074964 A discloses an undrivable state prediction device including an acquisition unit that acquires a captured image obtained by a camera that captures an image of the vehicle interior of the own vehicle, a detection unit that detects a current posture of a driver based on the captured image, and a state prediction unit that predicts a future undrivable state of the driver based on the current posture of the driver that has been detected by the detection unit and a database regarding a past posture of the driver.

Nevertheless, in the related art as disclosed in Japanese Patent Application Laid-open No. 2019-074964 A, although an undrivable state can be predicted, an abnormal state in which the driver is undrivable cannot be detected.

SUMMARY OF THE INVENTION

The present invention has been devised in view of the above-described circumstances, and is directed to providing an abnormality detection device that can detect a warning state indicating a warning that a driver is to become undrivable, and an abnormal state indicating that a driver is undrivable, while distinguishing therebetween.

In order to achieve the above mentioned object, an abnormality detection device according to one aspect of the present invention includes a control unit configured to detect, based on information regarding a driver of a vehicle that has been acquired by an input unit, a warning state indicating a warning that the driver is to become undrivable, and an abnormal state indicating that the driver is undrivable.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the present invention will be described in detail below based on the drawings. In addition, the present invention is not limited by the embodiment. Further, components in the following embodiment include the ones that can be replaced by those skilled in the art, and are easy, or the ones that are substantially identical.

Embodiment

Figure 1:
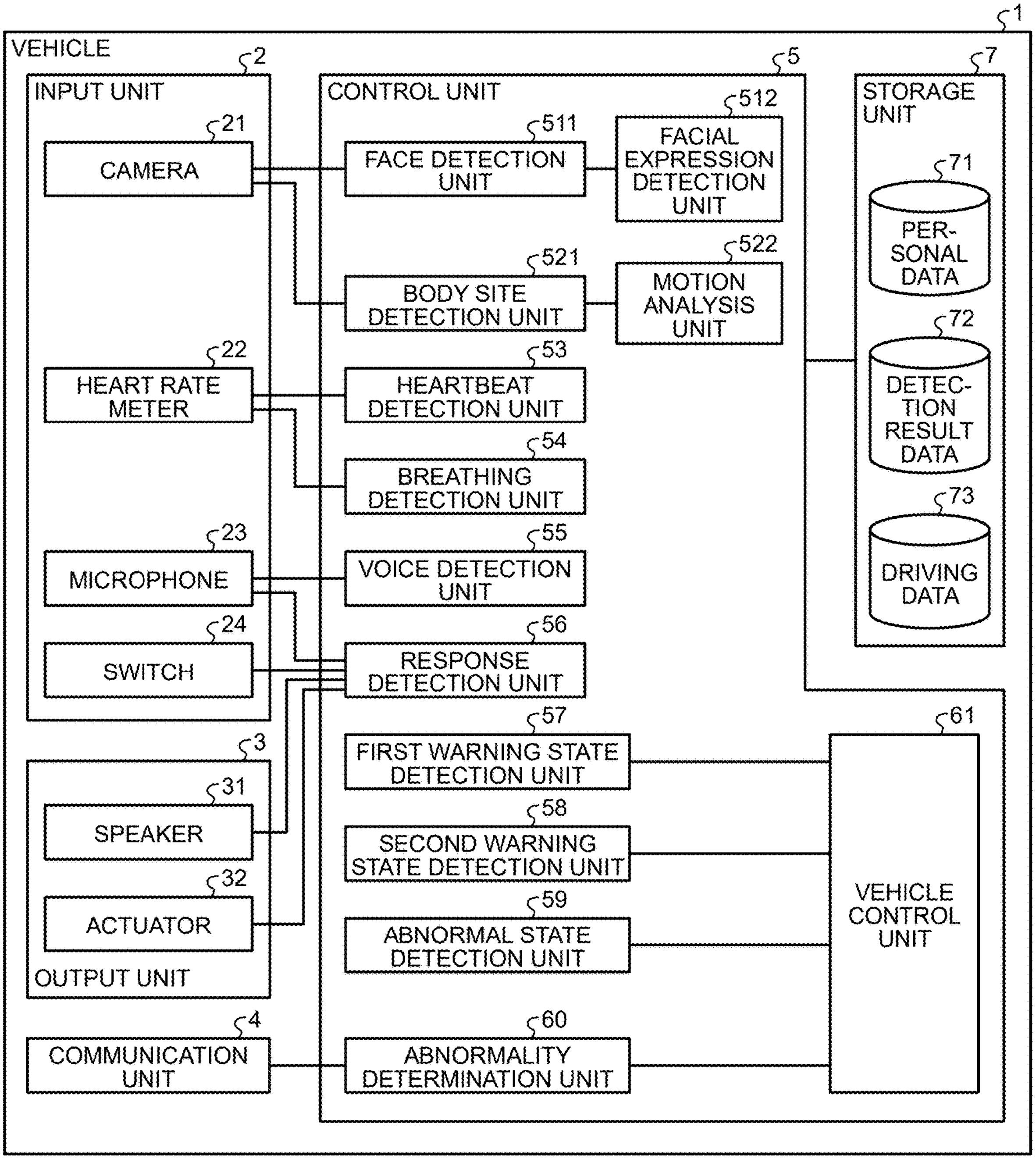
FIG. 1 is a block diagram illustrating a schematic configuration example of a vehicle including an abnormality detection device according to an embodiment.

FIG. 1 is a block diagram illustrating a schematic configuration example of a vehicle including an abnormality detection device according to an embodiment. A vehicle 1 including an abnormality detection device according to the present embodiment that is illustrated in FIG. 1 includes an input unit 2, an output unit 3, a communication unit 4, a control unit 5 serving as an abnormality detection device, and a storage unit 7.

The input unit 2 includes a camera 21, a heart rate meter 22, a microphone 23, and a switch 24.

The camera 21 generates image data obtained by capturing an image of a driver of the vehicle 1. The camera 21 includes, for example, a complementary metal oxide semiconductor (CMOS) image sensor. The camera 21 may be another type of image sensor, such as a charge-coupled device (CCD) image sensor.

The heart rate meter 22 measures the heart rate of the driver of the vehicle 1. The heart rate meter 22 may be mounted on a steering wheel, for example, or may be a wearable device such as a smartwatch that can be worn by the driver. Further, the pulse wave measurement may be non-contact measurement that is based on the Doppler effect that uses radio waves, or may detect pulses from facial coloration, or may measure the pressure generated by pulses, using a piezoelectric element. Further, the heart rate meter 22 may have a function of measuring the breathing of the driver of the vehicle 1 by the Doppler effect that uses radio waves.

The microphone 23 generates voice data obtained by acquiring voice of the driver of the vehicle 1.

The switch 24 includes a press button, for example, and if the driver presses the press button, the switch 24 outputs a predetermined signal.

The output unit 3 includes a speaker 31 and an actuator 32.

The speaker 31 outputs various types of voice under the control of the control unit 5.

The actuator 32 outputs various operations under the control of the control unit 5. The actuator 32 generates vibrations in a seat or the steering wheel, for example.

The communication unit 4 is connected wirelessly to a network, and transmits and receives information, signals, and the like, to and from various terminals connected to the network wirelessly or in a wired manner.

The control unit 5 includes well-known microcomputer-based electronic circuits including a central processing unit (CPU), a micro processing unit (MPU), an application specific integrated circuit (ASIC), a field programmable gate array (FPGA), or other central processing units, a read only memory (ROM), a random access memory (RAM), and an interface. The control unit 5 includes, a face detection unit 511, a facial expression detection unit 512, a body site detection unit 521, a motion analysis unit 522, a heartbeat detection unit 53, a breathing detection unit 54, a voice detection unit 55, a response detection unit 56, a first warning state detection unit 57, a second warning state detection unit 58, an abnormal state detection unit 59, an abnormality determination unit 60, and a vehicle control unit 61.

The face detection unit 511 performs face detection in image data obtained by image capturing executed by the camera 21.

The facial expression detection unit 512 detects various facial expressions of the driver of the vehicle 1 by extracting feature points of the face detected by the face detection unit 511. Specifically, the facial expression detection unit 512 detects facial expressions such as repeated opening and closing of the mouth wide, mouth half-open or wide open, intermittent and repeated head-lowering, severe coughing, frequent coughing, continuous rolled-back or closed eyes, pale face, distorted face (facial expression of enduring pain), and painful expression.

The body site detection unit 521 detects various sites of the body by detecting joint points and bones of a person being a driver.

The motion analysis unit 522 analyzes various motions of the driver of the vehicle 1 based on the motions of the sites detected by the body site detection unit 521. Specifically, the motion analysis unit 522 detects motions such as touching the head due to uncomfortable feeling, driving with one hand for a long time, placing his/her hand firmly on the chest, touching the chest with both hands as if rubbing it, rubbing the belly, loosening the collar of the tie or shirt, breathing with the shoulders, thrusting the chest out, sitting up and down many times, staggering, postural collapse (prone down, prone sideways, etc.), and cramps.

The heartbeat detection unit 53 detects the heart rate of the driver of the vehicle 1 based on a measurement result of the heart rate meter 22. Specifically, the heartbeat detection unit 53 detects a rapid rise or fall in heart rate, arrhythmia or tachycardia, a drop in blood pressure, or the like based on the measurement results of the heart rate meter 22.

In a case where the heart rate meter 22 has a function of measuring breathing, the breathing detection unit 54 detects the breathing of the driver of the vehicle 1 based on the measurement result. Specifically, the breathing detection unit 54 detects disordered breathing or the like based on the measurement result of the heart rate meter 22.

The voice detection unit 55 detects voice of the driver of the vehicle 1 from voice data generated by the heartbeat detection unit 53. Specifically, the voice detection unit 55 detects the driver's shouts, groans, slurred speech, loud breathing noise, and the like.

The response detection unit 56 detects a response of the driver to the call-out to the driver. The response of the driver may be a voice response or a response made by pressing the switch 24.

The first warning state detection unit 57 and the second warning state detection unit 58 detect a warning state indicating a warning that the driver is to become undrivable, based on information regarding the driver of the vehicle 1 that has been acquired by the input unit 2.

The first warning state detection unit 57 detects a first warning state in which the driver has a possibility of becoming undrivable. The first warning state detection unit 57 determines that the driver is in the first warning state, in a case where the first warning state detection unit 57 detects an unconscious behavior of the driver that has been performed in response to uncomfortable feeling for the body of the driver, for example.

The second warning state detection unit 58 detects a second warning state in which the driver has a higher possibility of becoming undrivable than in the first warning state. The second warning state detection unit 58 determines that the driver is in the second warning state, in a case where the second warning state detection unit 58 detects a behavior of the driver that is performed to cope with the abnormality of the body of the driver or to mitigate the abnormality of the body of the driver.

The abnormal state detection unit 59 detects an abnormal state indicating that the driver is undrivable, based on information regarding the driver of the vehicle 1. The abnormal state detection unit 59 determines that the driver is in the abnormal state, in a case where the abnormal state detection unit 59 detects that the driver is undrivable. Further, in a case where the abnormal state detection unit 59 detects the abnormal state, the abnormal state detection unit 59 performs call-out to the driver, and in a case where a response of the driver to the call-out has not been received within a predetermined period of time, the abnormal state detection unit 59 performs control of avoiding an accident of the vehicle. The call-out may be a voice call-out from the speaker 31 or may be a vibration notification from the actuator 32. Further, the driver may make a voice response and the response may be detected by the microphone 23, or the driver may make a response by pressing the switch 24.

The first warning state detection unit 57, the second warning state detection unit 58, and the abnormal state detection unit 59 respectively detect the first warning state, the second warning state, and the abnormal state by mutually-different state detection motion groups.

In a case where predetermined input is performed from the communication unit 4, the abnormality determination unit 60 determines that the driver is abnormal, and performs control of avoiding an accident of the vehicle. In a case where an external operator determines that the driver is undrivable, based on information from the camera 21 or the microphone 23, the external operator transmits a predetermined signal to the vehicle 1.

The vehicle control unit 61 controls the drive of the vehicle 1. The vehicle control unit 61 may be provided as an electrical control unit (ECU) different from the control unit 5. The vehicle control unit 61 performs different types of control on the vehicle 1 in the first warning state, the second warning state, and the abnormal state. Specifically, in the first warning state, the vehicle control unit 61 shortens a time threshold for starting driving assistance control of decelerating or stopping the vehicle 1. Further, in the second warning state, the vehicle control unit 61 further shortens a time threshold for starting driving assistance control of decelerating or stopping the vehicle 1, than in the first warning state. Further, in the second warning state, the vehicle control unit 61 performs call-out to the driver, and requests a response from the driver. Further, in the second warning state, the vehicle control unit 61 may perform preliminary control to safely stop the vehicle 1, such as limiting or reducing the speed of the vehicle 1, or maintaining a driving lane. Further, in the abnormal state, the vehicle control unit 61 further shortens a time threshold for starting driving assistance control of decelerating or stopping the vehicle 1, than in the second warning state. Further, in the abnormal state, the vehicle control unit 61 shortens a time threshold for waiting for a response. Further, in a case where the abnormality determination unit 60 determines that the driver is abnormal, the vehicle control unit 61 performs control of avoiding an accident of the vehicle 1 such as decelerating and stopping the vehicle 1.

The storage unit 7 may be, for example, a comparatively large-capacity storage device such as a hard disk, a solid state drive (SSD), or an optical disk, or a data-rewritable semiconductor memory such as a RAM, a flash memory, or a non volatile static random access memory (NVSRAM). The storage unit 7 stores conditions and information that are necessary for various types of processing in the control unit 5, various programs and applications to be executed by the control unit 5, control data, and the like. Further, the storage unit 7 stores personal data 71, detection result data 72, and driving data 73.

The personal data 71 is information regarding an individual of the driver of the vehicle 1, and includes information such as, for example, a name, gender, age, body weight, a blood pressure, a driving history, and a medical history.

The detection result data 72 is information regarding detection results obtained by the input unit 2 and the control unit 5, and includes information such as image data generated by the camera 21, a heart rate measured by the heart rate meter 22, voice data generated by the microphone 23, and detection results obtained by the first warning state detection unit 57, the second warning state detection unit 58, and the abnormal state detection unit 59.

The driving data 73 is information regarding the driving of the vehicle 1, and includes information such as the history of the driver's operations on the vehicle 1 and the history of the control of the vehicle 1 by the vehicle control unit 61.

Figure 2:
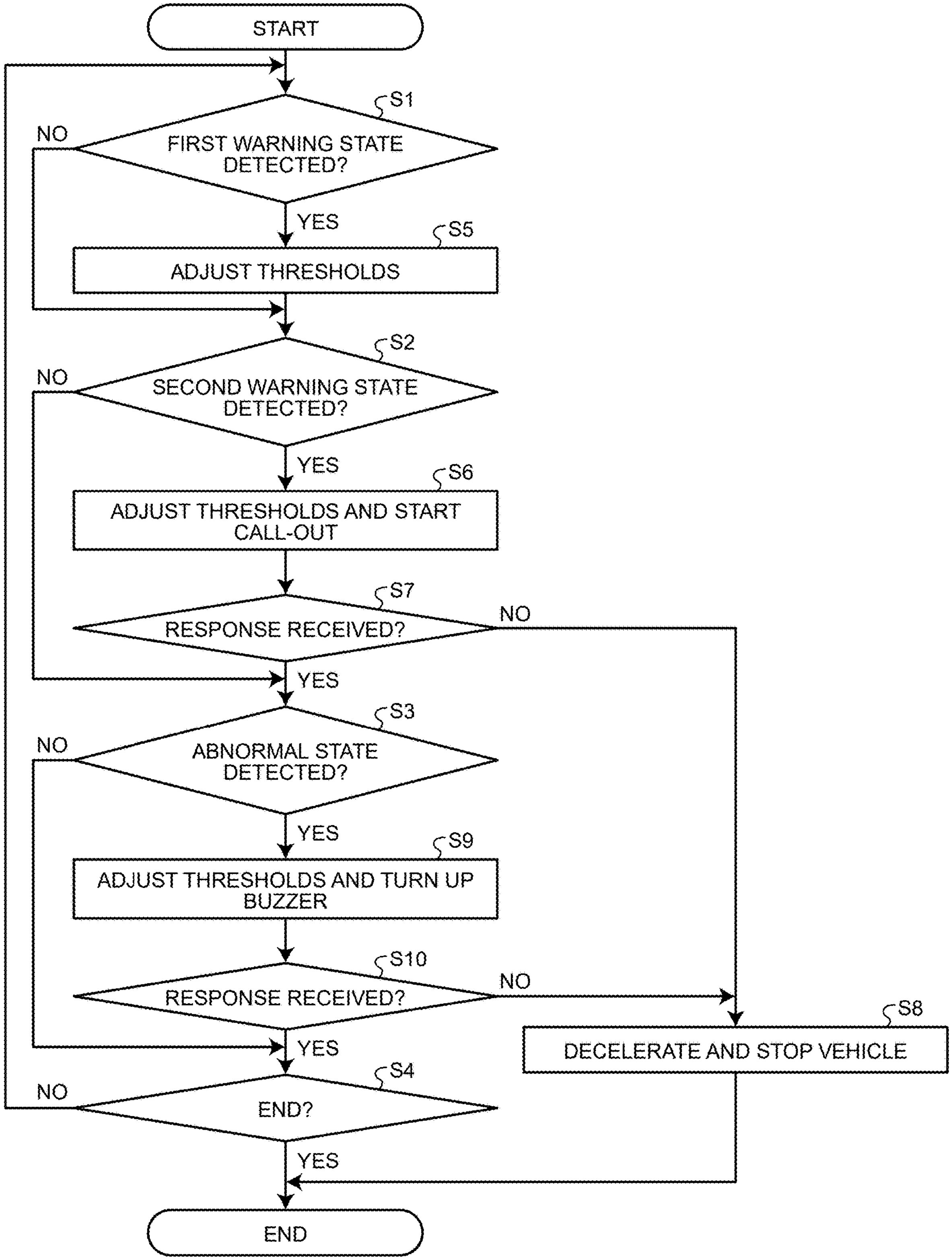
FIG. 2 is a flowchart illustrating an example of processing in an abnormality detection method.

Next, an abnormality detection method to be executed by the control unit 5 will be described. FIG. 2 is a flowchart illustrating an example of processing in an abnormality detection method. First of all, as illustrated in FIG. 2, the first warning state detection unit 57 determines whether or not the driver is in the first warning state (Step S1). In a case where the first warning state detection unit 57 detects, as an unconscious behavior of the driver that has been performed in response to uncomfortable feeling for the body of the driver, for example, a state detection motion group such as the driver of the vehicle 1 touching the face, chest or shoulders, opening the mouth, opening and closing the mouth, or coughing frequently, in image data obtained by capturing an image of the driver by the camera 21, the first warning state detection unit 57 determines that the driver is in the first warning state. Further, in a case where the heart rate meter 22 determines that the heartbeat of the driver of the vehicle 1 is rapidly rising or falling, the first warning state detection unit 57 may determine that the driver is in the first warning state.

In a case where the first warning state detection unit 57 determines that the driver is not in the first warning state (Step S1: No), the second warning state detection unit 58 determines whether or not the driver is in the second warning state (Step S2). In a case where the second warning state detection unit 58 detects, as a behavior of the driver that is performed to cope with the abnormality of the body of the driver or to mitigate the abnormality of the body of the driver, for example, a state detection motion group such as the driver of the vehicle 1 placing his/her hand firmly on the chest, having a painful expression, or having a change (worsening) in facial color, in image data obtained by capturing an image of the driver by the camera 21, the second warning state detection unit 58 determines that the driver is in the second warning state. Further, in a case where groan is detected in voice data of the driver that has been acquired by the microphone 23, the second warning state detection unit 58 may determine that the driver is in the second warning state. Further, in a case where arrhythmia, tachycardia, or disordered breathing is detected by the heart rate meter 22 in the heartbeats of the driver, the second warning state detection unit 58 may determine that the driver is in the second warning state.

In a case where the second warning state detection unit 58 determines that the driver is not in the second warning state (Step S2: No), the abnormal state detection unit 59 determines whether or not the driver is in the abnormal state (Step S3). In a case where the abnormal state detection unit 59 detects, as a state indicating that the driver is undrivable, for example, a state detection motion group such as the driver of the vehicle 1 opening eyes, rolling his/her eyes back, having a cramp, or losing his/her posture, in image data obtained by capturing an image of the driver by the camera 21, the abnormal state detection unit 59 determines that the driver is in the abnormal state. Further, in a case where it is determined from the driving data 73 that the driver of the vehicle 1 is not operating a steering wheel, the abnormal state detection unit 59 may determine that the driver is in the abnormal state. Further, in a case where the heart rate meter 22 determines that a blood pressure of the driver of the vehicle 1 is dropping, the abnormal state detection unit 59 may determine that the driver is in the abnormal state.

In a case where the abnormal state detection unit 59 determines that the driver is not in the abnormal state (Step S3: No), the control unit 5 determines whether or not a predetermined control signal indicating a driving end has been detected (Step S4). In a case where the control unit 5 determines that a predetermined control signal indicating a driving end has been detected (Step S4: Yes), a series of processes are ended.

On the other hand, in a case where the control unit 5 determines that a predetermined control signal indicating a driving end has not been detected (Step S4: No), the processing returns to Step S1, and the processing is continued.

In a case where the first warning state detection unit 57 determines in Step S1 that the driver is in the first warning state (Step S1: Yes), the control unit 5 adjusts various thresholds to be used by the vehicle control unit 61 for the control of the vehicle 1 (Step S5). For example, the control unit 5 causes the vehicle control unit 61 to shorten a time threshold for starting driving assistance control of decelerating or stopping the vehicle 1.

In a case where the second warning state detection unit 58 determines in Step S2 that the driver is in the second warning state (Step S2: Yes), the control unit 5 adjusts various thresholds to be used by the vehicle control unit 61 for the control of the vehicle 1, and starts call-out to the driver of the vehicle 1 (Step S6). For example, the control unit 5 causes the vehicle control unit 61 to further shorten a time threshold for starting driving assistance control of decelerating or stopping the vehicle 1, than in the first warning state. Further, the control unit 5 performs call-out by voice such as buzzer sound from the speaker 31, for example, and requests a voice response from the driver. Further, the control unit 5 may notify an external operator that the second warning state has been detected, using the communication unit 4. This makes it possible to issue a notification to an external operator earlier than issuing a notification after the detection of the abnormal state. Further, at this stage, the control unit 5 may perform preliminary control to safely stop the vehicle 1, such as limiting or reducing the speed of the vehicle 1, or maintaining a driving lane.

Subsequently, the control unit 5 determines whether or not a response has been received from the driver (Step S7). In a case where a predetermined response from the driver is detected by the microphone 23, for example, the control unit 5 determines that a response has been received from the driver.

In a case where the control unit 5 determines that a response has been received from the driver (Step S7: Yes), the processing proceeds to Step S3, and the processing is continued. At this time, the control unit 5 returns the various thresholds to be used by the vehicle control unit 61 for the control of the vehicle 1, to default values.

On the other hand, in a case where the control unit 5 determines that a response has not been received from the driver (Step S7: No), the control unit 5 causes the vehicle control unit 61 to execute processing of safely decelerating and stopping the vehicle 1 (Step S8). The control unit 5 outputs voice for reporting abnormality to the vehicle exterior from the speaker 31, decelerates the vehicle 1 while blinking a hazard flasher, stops the vehicle 1 at a safe road shoulder or the like, and ends the processing.

In a case where the abnormal state detection unit 59 determines in Step S3 that the driver is in the abnormal state (Step S3: Yes), the control unit 5 adjusts various thresholds to be used by the vehicle control unit 61 for the control of the vehicle 1, and turns up buzzer sound for calling out to the driver of the vehicle 1 (Step S9). For example, the control unit 5 causes the vehicle control unit 61 to further shorten a time threshold for starting driving assistance control of decelerating or stopping the vehicle 1, than in the second warning state. Further, the control unit 5 turns up the volume of call-out by buzzer sound from the speaker 31, for example, and shortens a time threshold for waiting for a response. Further, the control unit 5 may notify an external operator that the abnormal state has been detected, using the communication unit 4.

Subsequently, the control unit 5 determines whether or not a response has been received from the driver (Step S10). In a case where the control unit 5 determines that a response has been received from the driver (Step S10: Yes), the processing proceeds to Step S4, and the processing is continued. At this time, the control unit 5 returns the various thresholds to be used by the vehicle control unit 61 for the control of the vehicle 1, to default values.

On the other hand, in a case where the control unit 5 determines that a response has not been received from the driver (Step S10: No), the processing proceeds to Step S8, and the processing is continued.

According to the above-described abnormality detection device, because the control unit 5 detects a warning state and an abnormal state while distinguishing therebetween, it is possible to improve safety as compared with the case of detecting either one of the warning state and the abnormal state.

Further, according to the abnormality detection device, because the abnormality of the driver or an abnormality warning is detected using image data generates by the camera 21, a heart rate measured by the heart rate meter 22, or voice data generated by the microphone 23, it is possible to improve abnormality detection accuracy as compared with the case of detecting the abnormality of the driver using only images.

Further, according to the abnormality detection device, because different types of control are performed in the warning state and the abnormal state, it is possible to improve the safety of the vehicle 1 by executing, in the warning state, preliminary control for ensuring the safety of the vehicle 1, and executing, in the abnormal state, control of decelerating or stopping the vehicle 1 while ensuring the safety of the vehicle 1.

Further, according to the abnormality detection device, because a first warning state and a second warning state are detected, it is possible to detect an abnormality warning from a trivial change in the driver's state, such as an unconscious behavior of the driver.

Further, according to the abnormality detection device, by detecting the first warning state, the second warning state, and the abnormal state by different state detection motion groups, it is possible to gradually and accurately determine the state of the driver.

Further, according to the abnormality detection device, call-out is performed to the driver, and in a case where a response to the call-out has not been received, the vehicle 1 can be safely controlled.

Further, according to the abnormality detection device, by detecting an unconscious behavior of the driver that has been performed in response to uncomfortable feeling for the body of the driver, it is possible to detect an abnormality warning earlier.

Further, according to the abnormality detection device, by detecting a behavior of the driver that is performed to cope with the abnormality of the body of the driver, it is possible to accurately detect an abnormality warning.

Further, according to the abnormality detection device, by detecting that the driver is undrivable, it is possible to ensure the safety of the vehicle 1 by detecting an undrivable state earlier.

In addition, the above-described abnormality detection device according to an embodiment of the present invention is not limited to the above-described embodiment, and various changes can be made within the scope set forth in the appended claims.

In the above description, an example in which the vehicle 1 includes the control unit 5 serving as an abnormality detection device has been described, but a terminal provided on the outside of the vehicle 1 may have the function of the abnormality detection device.

The abnormality detection device according to the present embodiment may be formed by appropriately combining the components of the above-described embodiment and a modified example.

The abnormality detection device according to the present embodiment brings about an effect of being able to detect a warning state indicating a warning that a driver is to become undrivable, and an abnormal state indicating that a driver is undrivable, while distinguishing therebetween.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An abnormality detection device comprising:

a controller configured to:

detect, based on information regarding a driver of a vehicle that has been acquired by an input unit, a behavior of the driver that is performed to cope with an abnormality of a body of the driver or to mitigate the abnormality of the body of the driver;

determine a warning state indicating a prediction that the driver will become unable to drive the vehicle if the controller detects the behavior of the driver that is performed to cope with the abnormality or mitigate the abnormality; and detect, based on the information regarding the driver of the vehicle that has been acquired by the input unit, an abnormal state indicating that the driver is unable to drive the vehicle.

2. The abnormality detection device according to claim 1, wherein the input unit includes a camera configured to generate image data, and the information is the image data obtained by capturing an image of the driver by the camera.

3. The abnormality detection device according to claim 1, wherein the input unit includes a microphone configured to generate voice data, and the information is the voice data obtained by acquiring voice of the driver by the microphone.

4. The abnormality detection device according to claim 1, wherein the input unit includes a heart rate meter configured to measure a heart rate, and the information is the heart rate obtained by measuring heartbeats of the driver by the heart rate meter.

5. The abnormality detection device according to claim 1, wherein the controller performs different types of control on the vehicle in the warning state and the abnormal state.

6. The abnormality detection device according to claim 1, wherein the warning state includes a first warning state in which the driver has a first possibility of becoming unable to drive the vehicle, and a second warning state in which the driver has a second possibility of becoming unable to drive the vehicle, the second possibility is greater than the first possibility.

7. The abnormality detection device according to claim 6, wherein the controller detects the first warning state, the second warning state, and the abnormal state by mutually-different state detection motion groups.

8. The abnormality detection device according to claim 1, wherein in a case where the controller detects the abnormal state, the controller performs call-out to the driver, and in a case where a response of the driver to the call-out has not been received within a second time threshold, the controller performs control of avoiding an accident of the vehicle.

9. The abnormality detection device according to claim 1, wherein in a case where the controller detects an unconscious behavior of the driver that has been performed in response to uncomfortable feeling for a body of the driver, the control unit determines that the driver is in the warning state.

10. The abnormality detection device according to claim 1, wherein the controller is configured to:

set a first time threshold for starting a driving assistance control if the controller detects the warning state; and set a second time threshold for starting the driving assist control if the controller detects the abnormal state, the second time threshold is less than the first time threshold.

* * * * *